(12) United States Patent
Schmitz et al.

(10) Patent No.: US 11,724,623 B2
(45) Date of Patent: Aug. 15, 2023

(54) SYSTEM FOR COOLING A BATTERY OF A MOTOR VEHICLE, AND MOTOR VEHICLE

(71) Applicant: FORD GLOBAL TECHNOLOGIES, LLC, Dearborn, MI (US)

(72) Inventors: Claus Schmitz, Cologne (DE); Gerd Wittmacher, Overath (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 171 days.

(21) Appl. No.: 17/236,123

(22) Filed: Apr. 21, 2021

(65) Prior Publication Data

US 2021/0370798 A1 Dec. 2, 2021

(30) Foreign Application Priority Data

May 26, 2020 (DE) .......................... 102020206529.2

(51) Int. Cl.
*B60L 58/00* (2019.01)
*B60L 58/26* (2019.01)
(Continued)

(52) U.S. Cl.
CPC .......... *B60L 58/26* (2019.02); *B60H 1/00278* (2013.01); *B60K 1/04* (2013.01);
(Continued)

(58) Field of Classification Search
CPC .......... B60L 58/26; B60L 50/60; B60K 1/04; B60K 11/02
See application file for complete search history.

(56) References Cited

U.S. PATENT DOCUMENTS

| 7,797,954 B2* | 9/2010 | Duhme | B60H 1/00278 |
| | | | 62/185 |
| 8,758,924 B2* | 6/2014 | Tennessen | H01M 10/617 |
| | | | 429/120 |

(Continued)

FOREIGN PATENT DOCUMENTS

| DE | 10128164 A1 | 12/2002 |
| DE | 102009054186 A1 | 5/2011 |

(Continued)

OTHER PUBLICATIONS

Examination Report DE 102020206529.2 Filed Apr. 19, 2021, 7 pages.

(Continued)

*Primary Examiner* — Hau V Phan
(74) *Attorney, Agent, or Firm* — Brooks Kushman PC; David Kelley

(57) ABSTRACT

A system for cooling a battery of an electrified vehicle includes a vehicle air-conditioning system having a first cooling circuit in which a first cooling medium circulates, a second cooling circuit in which a second cooling medium circulates, a cooling unit in thermal contact with the battery, wherein the second cooling medium flows through the cooling unit, and with a heat exchanger through which the first and second cooling media flow in separate channels which are in thermal contact, wherein in the heat exchanger, heat is discharged from the second cooling medium towards the first cooling medium.

13 Claims, 1 Drawing Sheet

(51) Int. Cl.
  *B60L 50/60* (2019.01)
  *B60H 1/00* (2006.01)
  *B60K 1/04* (2019.01)
  *B60K 11/02* (2006.01)
  *B60K 1/00* (2006.01)

(52) U.S. Cl.
  CPC .............. *B60K 11/02* (2013.01); *B60L 50/60* (2019.02); *B60K 2001/005* (2013.01)

(56) References Cited

U.S. PATENT DOCUMENTS

| | | | |
|---|---|---|---|
| 9,573,437 B2* | 2/2017 | Osaka | B60H 1/0005 |
| 2002/0184908 A1* | 12/2002 | Brotz | B60H 1/143 |
| | | | 62/198 |
| 2004/0139757 A1* | 7/2004 | Kuehl | F25D 17/02 |
| | | | 62/434 |
| 2008/0022681 A1* | 1/2008 | Tafas | F01K 23/10 |
| | | | 60/618 |
| 2012/0090806 A1* | 4/2012 | Beschieru | B60H 1/00885 |
| | | | 165/41 |
| 2012/0253571 A1* | 10/2012 | Yun | H05K 7/20927 |
| | | | 363/141 |
| 2013/0298588 A1* | 11/2013 | Jojima | B60L 58/26 |
| | | | 62/324.6 |
| 2016/0190611 A1* | 6/2016 | Grundei | B60L 50/72 |
| | | | 429/434 |
| 2017/0253105 A1* | 9/2017 | Allgaeuer | B60H 1/143 |
| 2018/0292505 A1* | 10/2018 | Kong | H01M 10/6572 |
| 2019/0016231 A1* | 1/2019 | Scaringe | B60L 50/66 |
| 2019/0070951 A1* | 3/2019 | Lucke | H01M 10/625 |
| 2020/0052356 A1* | 2/2020 | Eadelson | H01M 10/613 |

FOREIGN PATENT DOCUMENTS

| | | |
|---|---|---|
| DE | 102009059240 A1 | 6/2011 |
| DE | 102010048853 A1 | 4/2012 |
| KR | 101198816 B1 | 5/2011 |

OTHER PUBLICATIONS

Chowdhury, Sourav et al. Total Thermal Management of Battery Electric Vehicles. National Renewable Energy Laboratory. May 30, 2018.7 pages.

* cited by examiner

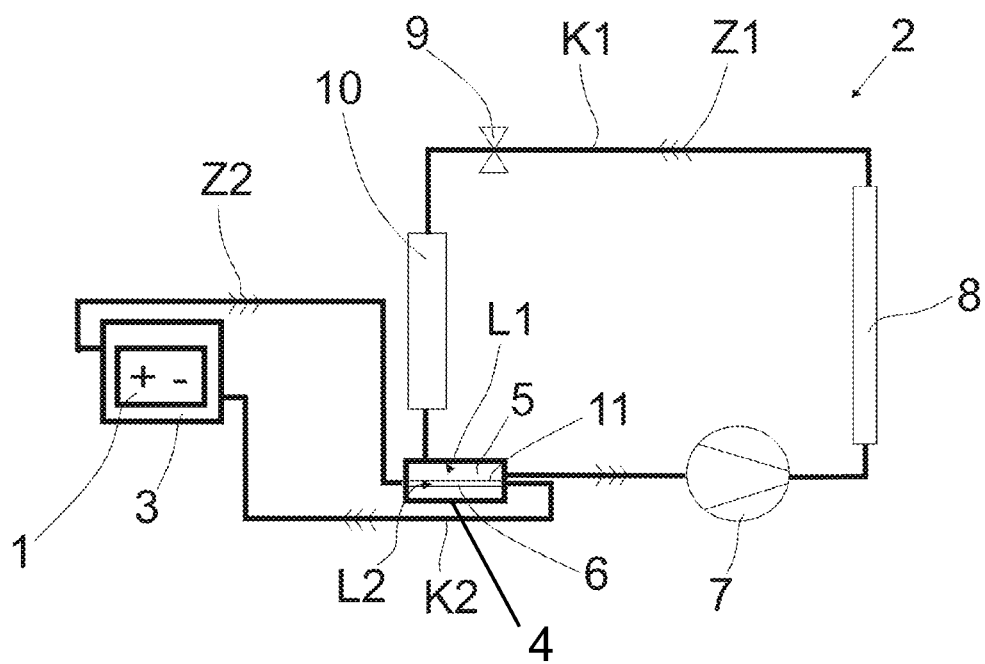

SYSTEM FOR COOLING A BATTERY OF A MOTOR VEHICLE, AND MOTOR VEHICLE

CROSS-REFERENCE TO RELATED APPLICATIONS

This application claims foreign priority benefits under 35 U.S.C. § 119(a)-(d) to DE Application 10 2020 206 529.2 filed May 26, 2020, which is hereby incorporated by reference in its entirety.

TECHNICAL FIELD

The present disclosure concerns a system for cooling a battery of a motor vehicle. The invention furthermore concerns a motor vehicle with a system according to the disclosure.

BACKGROUND

In the context of the present disclosure, the term "motor vehicle" means in particular a wheeled motor vehicle. Such wheeled vehicles may comprise cars, trucks, transport vehicles, utility vehicles, vehicles for the transport of persons or goods, agricultural vehicles, construction site vehicles, forklift trucks etc. In principle, the invention may however also be used for other types of vehicles such as aircraft (e.g. airplanes), ships (yachts) or rail vehicles. Many of said motor vehicles or vehicles use—at least partially—electrically generated drive energy. To provide this drive energy, often batteries or battery systems are used. Batteries may also be used for purposes other than providing drive energy. This disclosure relates to motor vehicles which contain such a battery or battery system for generating drive energy or other functions (e.g. for use as traction batteries etc.). The disclosure furthermore concerns vehicles which have a vehicle air-conditioning system (or AC system). Such systems are generally known and serve to set temperature and dehumidify the interior air.

To cool batteries, as used for example in electric vehicles and hybrid vehicles, it is known from the prior art to use air cooling or water cooling systems.

DE 10 2009 010 145 A1 describes a vehicle with a battery for supplying electrical power to an electric motor driving the vehicle. Battery connecting cables are in thermally conductive contact with a heat exchanger. The heat exchanger is loaded on one side with air, in order thus to dissipate heat from the battery. Furthermore, a fluid channel for a coolant of an air-conditioning device of the vehicle passes through the heat exchanger. A coolant pump conveys the coolant of the air-conditioning device through this fluid channel and thus also contributes to cooling the heat exchanger and hence the battery. A delivery power of the pump is here adapted to the thermal power to be transferred.

Battery cooling systems based on air cooling have the disadvantage that they depend greatly on the air temperature in the vehicle interior, but also on the temperature outside the vehicle. If air cooled via an air-conditioning system is used to cool the battery, then for example when the vehicle starts up, a certain run-up time is required to provide sufficient cooling. Depending on whether the air cooled by the air-conditioning system is drawn in from the vehicle interior or from the outside, the cooling efficiency also depends on local temperature fluctuations of the air drawn through the air-conditioning system or on the number of persons in the vehicle. If the battery cooling is not efficient enough, the battery power and hence—in the case of an electric vehicle, the drive power may also be reduced.

It is furthermore known from the prior art to cool vehicle batteries with liquid coolant in a cooling apparatus or cooling circuit provided specifically for battery cooling. The battery may be at least partially surrounded by a cooling apparatus or be in thermal contact therewith, wherein a corresponding coolant flows through the cooling apparatus. Surplus thermal energy from the battery is discharged to the coolant. An expansion valve and/or low-temperature heating element is often integrated in the cooling circuit of such a cooling apparatus. Such arrangements may lead to undesired high temperature rises, which are perceptible in the vehicle interior and have a disadvantageous effect on the climate in the passenger cell.

Taking into account the statements above, the present disclosure provides a system for cooling a battery of a motor vehicle that allows operation of the battery with high operating reliability. Furthermore, the cooling efficiency is improved in comparison with known battery cooling systems and thus also allows an increased performance efficiency of the battery.

SUMMARY

A system and motor vehicle is proposed for cooling a battery of a motor vehicle, in particular an electric vehicle. It is pointed out that the features individually described or illustrated may be combined with one another in any technically sensible fashion (including beyond category limits, for example between the method and device) and indicate further embodiments. It is furthermore pointed out that a conjunction "and/or" used herein between two features so as to link them together must always be interpreted such that only the first feature may be present in one embodiment of the subject of the invention, only the second feature may be present in a second embodiment, and both the first and also the second feature may be present in a third embodiment.

In one or more embodiments, a system comprises a vehicle air-conditioning system which comprises a first cooling circuit in which a first cooling medium circulates, a second cooling circuit in which a second cooling medium circulates, a cooling unit in thermal contact with the battery, wherein the second cooling medium flows through the cooling unit, and with a heat exchanger through which the first and second cooling media flow in separate channels which are in thermal contact, wherein in the heat exchanger, heat is discharged from the second cooling medium towards the first cooling medium.

As stated, the system according to one or more embodiments comprises a vehicle air conditioning system, also referred to as an A/C system. Today, most motor vehicles including electric vehicles comprise integrated A/C systems which are factory-fitted as standard. Manually controllable A/C systems and A/C systems with self-regulating automatic controllers are known and also covered by the claimed subject matter. Modern vehicle air conditioning systems may regulate not only the interior temperature but also the air quantity (e.g. by automatic selection of fan power) and air distribution (by actuation of different air vents). Multi-zone A/C systems are also known which may also form part of the system proposed here.

Usually, and as is also the case in the claimed subject matter, such a vehicle air conditioning system comprises a plurality of function units which are arranged successively with respect to a circulation direction of the first cooling medium in the first cooling circuit, namely a compressor, a condenser, an expansion unit and an evaporation unit, wherein the first cooling medium flows through each of the function units. The circulation of the first cooling medium is driven by the compressor. The first cooling circuit has a high-pressure side and a low-pressure side, wherein the high-pressure side is formed by the region between the compressor and the expansion unit, and the low-pressure side by the region between the expansion unit and the compressor. The first cooling medium may assume various aggregate states on passing through the first cooling circuit, in particular the liquid and gaseous aggregate states.

Gaseous first cooling medium is compressed in the compressor and thereby heated. It is then conveyed under high pressure through the condenser, wherein heat is extracted from the first cooling medium (which is warm at this point). As a result, the first cooling medium condenses, i.e. transforms into the liquid state.

It may furthermore be provided that a dryer unit (e.g. a filter dryer) extracts water and contaminants from the first cooling medium. Thus, the function units of the vehicle air-conditioning system may be protected from damage or corrosion.

Then, the now liquid first cooling medium flows to the expansion unit, which is preferably formed as an expansion valve. The valve ensures that a steady pressure is maintained upstream of the valve, whereas the pressure after the expansion valve may be reduced by volume enlargement. Since the expansion valve is positioned directly upstream of the evaporation unit in the circulation direction of the first cooling medium, the first cooling medium expands into the evaporation unit. In doing so, it changes its aggregate state from liquid to gaseous. During this physical process, the first cooling medium extracts heat from the environment, which may be perceived as evaporative cooling in the passenger compartment. In concrete terms, this occurs because the air to be cooled, which, for energy saving reasons, consists mainly of already cooled circulating air (not ambient air from the vehicle exterior), is conducted over the cooling fins of the evaporation unit. The heat necessary for the evaporation process of the first cooling medium is thus extracted from the air flowing past in the evaporation unit, thereby cooling the air. At the same time, due to condensation processes, moisture may also be extracted from the air. The condensation water occurring at the fins of the evaporation unit is then discharged to the exterior of the vehicle. The cooled air is then conducted into the passenger compartment via a ventilation system or suitable outlets. The now gaseous coolant is conducted back to the compressor on the low-pressure side and the cycle begins again.

To summarize, it can be found that during circulation in the first cooling circuit belonging to the A/C system, the first cooling medium evaporates, is compressed, condenses and then expands to resume the vapor phase.

As stated, the system furthermore comprises a second cooling circuit in which a second cooling medium circulates. In its circulation through the second cooling circuit, the second cooling medium does not come into substance contact with the first cooling medium circulating in the first cooling circuit. To cool the battery, it flows through said cooling unit which is in thermal contact with the battery. During circulation of the second cooling medium through the second cooling circuit, the second cooling medium preferably does not undergo a change of aggregate state, i.e. preferably remains liquid.

As also stated initially, the second cooling medium (and also the first cooling medium) flows through a heat exchanger. In the heat exchanger, separate channels are provided which are in mutual thermal contact and through which the first and second cooling media respectively flow. The channels may adjoin each other but, in order to avoid substance contact between the first and second cooling media, are separated from one another by a partition. The geometry (in particular in relation to the channel routing), size and cross-sectional form of the channels may vary.

In the heat exchanger, heat is extracted from the second cooling medium towards the first cooling medium. This is because the heat exchanger is arranged such that the first cooling medium flows through in cold state, while because of the absorption of battery heat, the second cooling medium has a higher temperature. The heat is thus transferred in the heat exchanger towards the first cooling medium. In other words, the system is based on the principle that a specific proportion of the cooling capacity (residual cooling capacity) of the first cooling medium is used to cool the second cooling medium, or to absorb thermal energy. Since the second cooling medium flows continuously through the second cooling circuit, the battery is continuously cooled or its surplus heat discharged (as long as the heat absorption capacity of the second cooling medium allows). Unexpected temperature rises in the battery are thus avoided, and a reliable and stable energy provision by the battery is ensured. In comparison with the system known from the prior art, the proposed system is simpler in its structure. Thus, there is no need to use a separate battery cooling system, which would require the provision of an additional expansion valve and possibly further components (compressor etc.).

Depending on the temperature of the battery, it is also conceivable that the above-mentioned system may, instead of serving for cooling, also be used for heating or warming the battery. This may be achieved substantially by setting the temperature of the first cooling medium via the A/C system, because indirectly (in particular via the thermal contact created by the heat exchanger between the first and second cooling media) this also influences the temperature of the second cooling medium which, in the case of a second cooling medium temperature lying above the battery temperature, can emit heat to the battery. This may be advantageous in particular on start-up of the motor vehicle, for example at low exterior temperatures.

It may occur that the second cooling medium is thermally coupled to the first cooling circuit (of the A/C system) or the first cooling medium, so that the first cooling medium can influence a second cooling circuit directly, i.e. without the interposition of further media flows.

Advantageous embodiments which are within the scope of the claims, and further advantageous (or possible) embodiments of the system proposed, are described in detail below.

According to a first embodiment of a system or vehicle, it may be provided that the vehicle air-conditioning system comprises a plurality of function units which are arranged successively with respect to a circulation direction of the first cooling medium in the first cooling circuit, namely a compressor, a condenser, an expansion unit and an evaporation unit, wherein the first cooling medium flows through each of the function units. Line portions of the first cooling circuit are provided between the function units. The function of the above-mentioned function units has already been explained in detail above, so repetitions are omitted at this point. The term "circulation direction" means a circuit direction or flow direction of the first cooling medium, wherein during circulation the first cooling medium may assume different aggregate states (liquid, gaseous). Such function units are not provided in the second cooling circuit, but at least one pump unit may be provided which allows circulation of the second cooling medium in the second cooling circuit. The pump unit may be switchable or controllable so as to reverse the circulation direction of the second cooling medium if required. The function units of the vehicle air-conditioning system, and components of the second cooling circuit (e.g. said pump unit), may be controllable or regulatable by a central control and regulation unit, preferably automatically.

In addition, the vehicle air-conditioning system may comprise a heating circuit in which e.g. an auxiliary evaporator and auxiliary pressure relief valve are connected in series, in order to dry the heated air in a heating mode.

In a further embodiment of a system or vehicle, it may be provided that a line portion of the first cooling circuit provided between the evaporation unit and the compressor passes through the heat exchanger. It may furthermore be provided that a line portion of the second cooling circuit passes through the heat exchanger. The line portions pass through the heat exchanger and are configured such that no substance exchange may take place between the first and second cooling media, but a heat exchange or heat flow is possible. Inside the heat exchanger, the line portions of the first and/or second cooling circuit may have a shape or line routing which deviates from the line portions arranged outside the heat exchanger. Due to the above-mentioned technical variants, it is possible that in a cooling mode (i.e. with a temperature gradient between the first and second cooling media with a lower temperature of the first cooling medium), heat may be emitted towards the first cooling medium and absorbed by this. In this case, the battery (which is partially surrounded by the cooling unit through which the second cooling medium flows) may be cooled by heat dissipation. Also, it is possible that in a heating mode (i.e. a temperature gradient between the first and second cooling media with a lower temperature of the second cooling medium), heat is emitted towards a second cooling medium and absorbed by this. In this case, the battery (which is partially surrounded by the cooling unit through which the second cooling medium flows) is heated by heat supply.

According to a further embodiment of a system proposed by the invention, it may be provided that the line portion of the first cooling circuit and the line portion of the second cooling circuit pass at least partially coaxially through the heat exchanger. This means that the first line portion is surrounded by the second line portion or vice versa. The line portions in the heat exchanger may thus be divided into an inner and outer channel. In cross-section, the first and second line portions or the inner and outer channels are thus arranged concentrically. If for example the line portion of the second cooling channel provides the inner channel, the second cooling medium flows around the inner channel from the outside (through the outer channel). The heat exchange takes place through a channel wall or partition wall between the inner and outer channels, wherein the wall is made from a thermally conductive material (e.g. metal or a suitable plastic). Alternatively, the line portion of the first cooling circuit may provide the inner channel which is surrounded by the line portion of the second cooling circuit. In this case, the second cooling medium flows around the first cooling medium. A coaxial arrangement of the line portions thus leads to a particularly efficient heat exchange.

According to a further embodiment of the system or vehicle, it may be provided that the line portions of the first and second cooling circuits passing through the heat exchanger, pass through the heat exchanger such that the first and second cooling media flow through the heat exchanger in co-flow or in contra-flow. The flow speeds of the first and second cooling media may also be adjusted or controlled flexibly, at least in the line portions which pass through the heat exchanger. In this way, the flow of cooling media may be adjusted for example to create a laminar or turbulent flow. It may furthermore be provided that in the line portions of the first and/or second cooling circuit which pass through the heat exchanger, eddy or constriction elements are provided in order to adapt the eddy or flow speed of the cooling media (e.g. to improve the heat transmission).

According to a further embodiment of the system or vehicle, it may be provided that the cooling unit is configured in the form of a cooling coil at least partially surrounding the battery, or a battery housing. The form of the cooling unit is not limited to such an embodiment. It may however be advantageous if the cooling unit is configured such that it surrounds as large a part of the battery as possible for the purpose of optimizing heat dissipation (cooling function) or heat supply (heating function). Instead of a cooling coil, a cavity or one or more channels may be provided in the battery housing, through which the second cooling medium flows. Independently of the type and shape of the cooling unit, its tightness must be guaranteed in order to avoid an escape of the second cooling medium.

According to a further embodiment of the system or vehicle, the system may be configured to guarantee, in particular during an operating state of the motor vehicle, a continuous circulation of the first and second cooling media in the respective first and second cooling circuits. It may optionally be provided to adapt or adjust the flow speed of the second cooling medium flexibly or automatically via a pump unit. A continuous circulation of the second cooling medium allows an even cooling and avoids spontaneous temperature peaks of the battery.

According to a further embodiment, it may be provided that at least one cooling circuit temperature sensor is arranged in each of the first and second cooling circuits and is configured to detect the cooling medium temperature of the respective first or second cooling medium. The cooling circuit temperature sensors may measure and detect the temperature present in the cooling circuits or cooling media. According to a further embodiment, the system may comprise a battery temperature sensor which is arranged on the battery or on a battery housing surrounding the battery, and is configured to detect a battery temperature. The system may furthermore comprise a control unit which is connected for signaling and control purposes to the at least one cooling circuit temperature sensor of the respective first or second cooling circuit, to the battery temperature sensor and at least one of the function units of the vehicle air-conditioning system, and which is configured to control the vehicle air-conditioning system on the basis of the detected battery temperature. Depending on a temperature gradient between the first and second cooling media or on the battery temperature, it may be determined whether heating or cooling of the battery is necessary, and which temperature of the first cooling medium is required for this. Insofar as the cooling medium temperature of the second coolant lies above the cooling medium temperature of the first coolant, a heat dissipation towards the first cooling medium may take place. Conversely, if the cooling medium temperature of the first cooling medium lies above the cooling medium temperature of the second cooling medium, a heat transport towards the second cooling medium may take place and hence a heating of the battery. The control unit may comprise a control algorithm or software which takes account of all the above-mentioned parameters for controlling the system or function units in order to optimize the battery temperature. For example, it may be provided that the cooling medium temperature of the first cooling medium is set such that cooling of the battery takes place when a critical limit battery temperature is reached (by reducing the cooling medium temperature of the first cooling medium to a lower temperature than the cooling medium temperature of the second cooling medium, allowing a heat dissipation from the battery towards a second cooling medium and from the second cooling medium towards the first cooling medium).

As stated initially, one or more embodiments may include a motor vehicle, in particular an electric vehicle, with a system for cooling a battery as described herein. It is conceivable to equip a motor vehicle with a system according to the various embodiments at the time of manufacture, but it is also not excluded to fit such a system to an already existing motor vehicle.

Further features and advantages arise from the following description of representative embodiments which should not be interpreted restrictively and is explained in more detail below with reference to the drawing.

BRIEF DESCRIPTION OF THE DRAWINGS

FIG. 1 is a schematic diagram of a battery cooling system having first and second cooling circuits.

DETAILED DESCRIPTION

As required, detailed embodiments are disclosed herein; however, it is to be understood that the disclosed embodiments are merely representative and may be embodied in various and alternative forms. The FIGURE is not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

FIG. 1 shows a flow diagram of a system for cooling a battery 1 of a motor vehicle. As stated, the motor vehicle is in particular an electric vehicle. The system comprises a vehicle air-conditioning system 2 (A/C system) which has a first cooling circuit K1 in which a first cooling medium circulates. The system furthermore comprises a second cooling circuit K2 in which a second cooling medium circulates. The battery 1 is in thermal contact with a cooling unit 3 (and in particular is surrounded by this), wherein the second cooling medium flows through the cooling unit 3. The cooling unit 3 is part of the second cooling circuit K2.

As shown in the FIGURE, the vehicle air-conditioning system 2 comprises a plurality of function units which are arranged successively in relation to a circulation direction Z1 of the first cooling medium in the first cooling circuit K1, namely a compressor 7, a condenser 8, an expansion unit 9 and an evaporation unit 10, wherein the first cooling medium flows through each function unit. In the illustration in FIG. 1, the circulation directions Z1, Z2 of the first and second cooling media through the heat exchanger 4 are in co-flow, but this need not necessarily be the case, since also contra-flow circulation directions Z1, Z2 of the first and second cooling media are possible.

The circulation of the first cooling medium is driven by the compressor 7. The first cooling circuit K1 has a high-pressure side and a low-pressure side, wherein the high-pressure side is formed by the region arranged between the compressor 7 and the expansion unit 9, and the low-pressure side is formed by the region arranged between the expansion unit 9 and the compressor 7.

Gaseous first cooling medium is compressed in the compressor 7 and thereby heated. Then it is conveyed under high pressure through the condenser 8, wherein heat is extracted from the first cooling medium (which is warm at this point). As a result, the first cooling medium condenses, i.e. transforms from the gaseous to the liquid state.

Then the now liquid first cooling medium flows to the expansion unit 9 which is configured as an expansion valve. The valve ensures that an even pressure is maintained upstream of the valve, whereas the pressure after the expansion valve may be reduced by volume enlargement. Since the expansion valve is positioned directly upstream of the evaporation unit 10 in the circulation direction Z1 of the first cooling medium, the first cooling medium expands into the evaporation unit 10. It thus changes its aggregate state from liquid to gaseous. In this physical process, the first cooling medium extracts heat from the environment, which may be perceived as evaporative cooling in the passenger compartment.

A heat exchanger 4 is arranged between the evaporation unit 10 and the compressor 7, through which the first and second cooling media flow in separate channels 5, 6 which are in thermal contact, wherein in the heat exchanger 4, heat is dissipated from the second cooling medium towards the first cooling medium. Depending on the temperature of the first and second cooling media, heat may also be dissipated towards the second cooling medium, whereby heating of the battery 1 is possible. The channel 5 is formed by a line portion L1 of the first cooling circuit K1, which is provided between the evaporation unit 10 and the compressor 7 and passes through the heat exchanger 4. The channel 6 is formed by a line portion L2 of the second cooling circuit K2.

The line portion L1 of the first cooling circuit K1 and the line portion L2 of the second cooling circuit K2 pass at least partially coaxially through the heat exchanger 4. In the present example, the line portion L2 provides an inner channel 6, and the line portion L1 provides an outer channel 5 surrounding the inner channel 6. In cross-section, the channels 5, 6 are arranged concentrically. A wall 11 between the channels 5, 6 prevents a substance exchange between the first and second cooling media, but at the same time allows heat transport.

While representative embodiments are described above, it is not intended that these embodiments describe all possible forms of the claimed subject matter. The words used in the specification are words of description rather than limitation, and it is understood that various changes may be made without departing from the spirit and scope of the claimed subject matter. Additionally, the features of various implementing embodiments may be combined to form further embodiments that may not be explicitly illustrated or described.

What is claimed is:

1. An electrified vehicle comprising:
an air-conditioning system including a first cooling circuit, wherein a first cooling medium circulates within the first cooling circuit;
a second cooling circuit, wherein a second cooling medium circulates within the second cooling circuit;
a cooling unit in thermal contact with a traction battery, wherein the second cooling medium flows through the cooling unit; and a heat exchanger through which the first and second cooling media flow in separate channels which are in thermal contact, wherein in the heat exchanger, heat is discharged from the second cooling medium and absorbed by the first cooling medium, wherein a first line portion of the first cooling circuit provided between the evaporator and the compressor passes through the heat exchanger; and a second line portion of the second cooling circuit passes through the heat exchanger, the first line portion and the second line portion passing at least partially coaxially through the heat exchanger.

2. The electrified vehicle of claim 1 wherein the air-conditioning system includes a plurality of function units arranged in a circulation direction of the first cooling medium in the first cooling circuit, the plurality of function units comprising:

a compressor;

a condenser;

an expansion valve; and an evaporator, wherein the first cooling medium flows through each of the function units.

3. The electrified vehicle of claim 1 further comprising:

a pump configured to circulate the second cooling medium through the second cooling circuit and through the heat exchanger in a flow direction opposite a flow direction of the first cooling medium through the heat exchanger.

4. The electrified vehicle of claim 1 wherein the cooling unit comprises a cooling coil at least partially surrounding the traction battery.

5. The electrified vehicle of claim 1 further comprising at least one cooling circuit temperature sensor arranged in each of the first and second cooling circuits and configured to detect temperature of the first and second cooling media, respectively.

6. The electrified vehicle of claim 5 further comprising a battery temperature sensor configured to provide a signal indicative of temperature of the traction battery.

7. The electrified vehicle of claim 6 further comprising a controller in communication with the at least one cooling circuit temperature sensor and the battery temperature sensor, the controller configured to control the air-conditioning system in response to the signal from the battery temperature sensor.

8. A vehicle system comprising:

an air conditioning system including a compressor, a condenser, an expansion valve, and an evaporator coupled by a first cooling circuit configured for circulating a first cooling medium;

a traction battery;

a cooling coil at least partially surrounding the traction battery;

a pump coupled to a second cooling circuit and configured to circulate a second cooling medium through the cooling coil;

a heat exchanger coupled to the first cooling circuit and the second cooling circuit;

a first temperature sensor configured to provide a signal responsive to temperature of the first cooling medium;

a second temperature sensor configured to provide a signal responsive to temperature of the second cooling medium; and a controller configured to control the air conditioning system in response to at least the signals from the first and second temperature sensors to selectively cool the traction battery.

9. The vehicle system of claim 8 wherein the pump is configured to circulate the second cooling medium through the heat exchanger in a counter flow direction relative to the first cooling medium flowing through the heat exchanger.

10. The vehicle system of claim 9 wherein the first cooling circuit includes a first line portion passing through the heat exchanger and the second cooling circuit includes a second line portion passing through the heat exchanger, and wherein the first line portion is coaxially arranged relative to the second line portion.

11. A method for cooling a traction battery of an electrified vehicle having an air conditioning system, the method comprising:

circulating a first cooling medium through a vehicle air conditioning circuit of the air conditioning system and a first line portion of a heat exchanger; and circulating a second cooling medium through a second line portion of the heat exchanger and through a cooling unit of the traction battery, wherein the first line portion and the second line portion are coaxially arranged through the heat exchanger.

12. The method of claim 11 further comprising controlling the air conditioning system based on temperature of the second cooling medium.

13. The method of claim 12 wherein circulating the second cooling medium comprises operating a pump to circulate the second cooling medium in a counterflow direction of the first cooling medium through the heat exchanger.

* * * * *